(12) United States Patent
Yoon et al.

(10) Patent No.: US 9,487,680 B2
(45) Date of Patent: Nov. 8, 2016

(54) PRESSURE SENSITIVE ADHESIVE COMPOSITIONS, POLARIZERS AND LIQUID CRYSTAL DISPLAYS COMPRISING THE SAME

(75) Inventors: Sung Soo Yoon, Daejeon (KR); No Ma Kim, Daejeon (KR); In Ho Hwang, Daejeon (KR); Jeong Min Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 27 days.

(21) Appl. No.: 12/988,779

(22) PCT Filed: Apr. 9, 2009

(86) PCT No.: PCT/KR2009/001830
§ 371 (c)(1),
(2), (4) Date: Jan. 10, 2011

(87) PCT Pub. No.: WO2009/131321
PCT Pub. Date: Oct. 29, 2009

(65) Prior Publication Data
US 2011/0109848 A1 May 12, 2011

(30) Foreign Application Priority Data

Apr. 21, 2008 (KR) .................. 10-2008-0036696
Oct. 14, 2008 (KR) .................. 10-2008-0100662

(51) Int. Cl.
| G02F 1/1335 | (2006.01) |
| C09J 133/06 | (2006.01) |
| C09J 133/08 | (2006.01) |
| G02B 5/30 | (2006.01) |

(52) U.S. Cl.
CPC ........... *C09J 133/066* (2013.01); *C09J 133/08* (2013.01); *B32B 2457/202* (2013.01); *C08L 2312/00* (2013.01); *G02B 5/3025* (2013.01); *Y10T 428/1041* (2015.01); *Y10T 428/1059* (2015.01)

(58) Field of Classification Search
CPC .. C09J 2433/00; C09J 133/00; C09J 133/08; C09J 133/10; C09J 133/12; C09J 201/00; C09J 201/10; C09J 2201/00; C09J 2201/02; C09J 133/066; C09J 133/06; C09J 7/00; G02F 1/133345; G02F 2001/1533; G02F 2001/1536; G02F 2202/28; B32B 17/10743; B32B 27/00; B32B 27/04; B32B 27/06; B32B 27/08; B32B 27/16; B32B 7/12; B32B 2457/202; C08L 2312/00; G02B 5/3025; Y10T 428/1041; Y10T 428/1059

USPC ......... 349/96; 428/1.1, 413, 355 R; 522/114; 524/556
See application file for complete search history.

(56) References Cited

U.S. PATENT DOCUMENTS

| 5,741,542 | A | * | 4/1998 | Williams et al. ......... 427/208.4 |
| 2004/0127594 | A1 | | 7/2004 | Yang et al. |
| 2005/0191507 | A1 | * | 9/2005 | Yang et al. .................... 428/523 |
| 2005/0217789 | A1 | * | 10/2005 | Eckstein et al. ......... 156/244.11 |
| 2006/0162857 | A1 | * | 7/2006 | Nagamoto et al. ........ 156/272.8 |
| 2007/0055006 | A1 | * | 3/2007 | Kim et al. .................... 524/556 |
| 2007/0092733 | A1 | * | 4/2007 | Yang et al. .................... 428/413 |
| 2007/0148485 | A1 | * | 6/2007 | Kusama et al. .............. 428/520 |
| 2011/0032455 | A1 | * | 2/2011 | Kim et al. ....................... 349/96 |
| 2011/0205469 | A1 | * | 8/2011 | Ha et al. .......................... 349/96 |

FOREIGN PATENT DOCUMENTS

| CN | 1862330 | | 11/2006 | |
| JP | 5-117610 | A | 5/1993 | |
| JP | 06256735 | A * | 9/1994 | ............... C09J 7/02 |
| JP | 2002-047468 | | 2/2002 | |
| JP | 2003-049141 | | 2/2003 | |
| JP | 2006-235568 | A | 9/2006 | |
| JP | 2007-197659 | | 8/2007 | |
| JP | 2007-212995 | | 8/2007 | |
| KR | 1998-0079266 | | 11/1998 | |
| KR | 10-2002-0060272 | A | 7/2002 | |
| KR | 10-2007-0094066 | A | 9/2007 | |
| TW | 200634121 | A | 10/2006 | |
| WO | WO 2007/068625 | A1 | 6/2007 | |

OTHER PUBLICATIONS

Oochi et al., JP 06256735 A, English Machine Translation provided by http://dossier1.ipdl.inpit.go.jp/AIPN/odse_top_dn.ipdl?N0000=7400.*
Benedek, Istvan, Pressure-Sensitive Formulation, Sep. 28, 2000, p. 77.*

* cited by examiner

*Primary Examiner* — Ellen S Wood
*Assistant Examiner* — Eli D Strah
(74) *Attorney, Agent, or Firm* — Dentons US LLP

(57) ABSTRACT

The present invention relates to pressure-sensitive adhesive compositions including interpenetrating polymer networks in a cured state, which comprise a multi-functional acrylate, a photo initiator and a thermal initiator; polarizers; and liquid crystal displays comprising the same. In the present invention, a pressure-sensitive adhesive composition is provided, which can prevent light-leakage phenomenon, and has excellent physical properties such as endurance under high temperature and/or high humidity conditions and workability, such as removability.

13 Claims, No Drawings

PRESSURE SENSITIVE ADHESIVE COMPOSITIONS, POLARIZERS AND LIQUID CRYSTAL DISPLAYS COMPRISING THE SAME

This application is a National Stage Entry of International Application No. PCT/KR2009/001830, filed Apr. 9, 2009, and claims the benefit of Korean Application Nos. 10-2008-0036696, filed on Apr. 21, 2008, and 10-2008-0100662, filed on Oct. 14, 2008, which are hereby incorporated by reference for all purposes as if fully set forth herein.

TECHNICAL FIELD

The present invention relates to pressure-sensitive adhesive compositions having excellent endurance, workability and light leakage-preventing properties; polarizers; and liquid crystal displays comprising the same.

BACKGROUND ART

A liquid crystal display is a device for displaying images through liquid crystals inserted between two sheets of thin glass substrates. In said device, when voltages are applied through electrodes connected to the liquid crystals, the molecular alignment of the liquid crystals changes, whereby the transmission ratio of light passing through the liquid crystals is changed, so that pictures or colors may be represented. Liquid crystal displays have advantages in that they use very little power and can be made flat and very thin. Therefore, it is the preferred display device in various fields at the present time.

To manufacture a liquid crystal display, liquid crystal cells comprising liquid crystals and glass substrates having a transparent electrode, and polarizers are required, and suitable adhesives or pressure-sensitive adhesives are also required for binding them.

The polarizer comprises an iodine compound or a dichroic polarizing material aligned in a certain direction, and has a multi-layer structure comprising TAC (triacetyl cellulose) protective films for protecting polarizing elements, and the like. In addition, the polarizer may additionally comprise a compensation film for a wide viewing angle such as a liquid crystal film, a phase difference film, and the like. Each film composing a polarizer is made of materials having different molecular structures and compositions, and so has different physical properties. Thus, under high temperature and/or high humidity conditions, the polarizer has inferior dimensional stability, since the shrinkage or expansion of materials having a unidirectional molecular alignment is different. Therefore, if the polarizer is fixed by a pressure-sensitive adhesive, stress is concentrated on the TAC layer under high temperature and/or high humidity conditions, and birefringence and light leakage phenomenon occur.

As a representative method for solving said problems, there is a method for giving stress relief properties to a pressure-sensitive adhesive by designing it to have high creep against external stress and allowing it to be easily modified. Specifically, the method includes mixing a high molecular weight polymer containing a functional group which may react with a cross-linking agent, with a low molecular weight material including less or no cross-linkable functional group (KR Laid-open Patent Publication No. 1998-0079266, and JP Laid-open Patent Publication Nos. 2002-047468 and 2003-049141).

However, the pressure-sensitive adhesive composition disclosed in said techniques has very poor tailoring properties. Thus, while preparing a polarizer, crooking or pressing phenomenon occurs in the pressure-sensitive adhesive. So, there is a problem in that the yield is drastically lowered.

As another technique for preventing light leakage phenomenon, there is a method for designing the pressure-sensitive adhesive to be very hard. When the pressure-sensitive adhesive is designed to be very hard, shrinking or expansion of the pressure-sensitive adhesive under high temperature and/or high humidity conditions is suppressed, whereby the resulting stress is minimized and focused on the outermost portions of the polarizer, so that relatively good optical properties may be realized.

However, in order to design the pressure-sensitive adhesive to be very hard, the bulk modulus of the adhesive should be greatly increased, and thereby its endurance decreases, since the adhesive property diminishes as the modulus increases.

Also, there are other proposed methods in which a photo initiator and a multi-functional acrylate are added to a conventional pressure-sensitive adhesive having a single crosslinking structure, so as to improve the bulk modulus, since the conventional single crosslinking structure cannot realize a large enough bulk modulus to maintain good light leakage-resistance properties and endurance (JP Laid-open Patent Publication Nos. 2007-197659 and 2007-212995).

The pressure-sensitive adhesive compositions disclosed in said publications have an advantage in that post treatments after curing processes are not required, due to a fast crosslinking rate of the multi-functional acrylate by the photo initiator.

However, the pressure-sensitive adhesive compositions have un-uniform crosslinking structures, and very poor adhesion properties in the surface thereof, owing to a difference in crosslinking degrees between the surface and the bulk of the adhesive. Also, the pressure-sensitive adhesive compositions have a disadvantage in that a large light-leakage phenomenon is induced in the outermost portions of the polarizer, when it is actually applied to the polarizer.

DISCLOSURE OF INVENTION

Technical Problem

The present invention is accomplished considering the problems of the prior arts as described above, and is intended to provide a pressure-sensitive adhesive composition having excellent physical properties such as endurance under high temperature and/or high humidity conditions, cuttability, removability and workability, and representing excellent light leakage-preventing properties, a polarizer and a liquid crystal display using the same.

Technical Solution

In one embodiment of the invention, a pressure-sensitive adhesive composition is provided which includes interpenetrating polymer networks in a cured state; and comprises a multi-functional acrylate, a photo initiator and a thermal initiator.

In another embodiment of the invention, a polarizer is provided, which comprises a polarizing film or a polarizing device; and a pressure-sensitive adhesive layer which is formed on one or both sides of said film or device, and comprises a cured product of the pressure-sensitive adhesive composition.

In still another embodiment of the invention, a liquid crystal display is provided, which comprise a liquid crystal panel in which the polarizer is bonded to one or both sides of a liquid crystal cell.

Advantageous Effects

According to the present invention, a pressure-sensitive adhesive composition is provided, which has excellent physical properties such as endurance under high temperature and/or high humidity conditions, cuttability, removability and workability, and representing excellent light leakage-preventing properties even in the case of being used in large display devices with a size of 20 inches or more, a polarizer and a liquid crystal display using the same.

BEST MODE FOR CARRYING OUT THE INVENTION

The present invention relates to a pressure-sensitive adhesive composition, including interpenetrating polymer networks (hereinafter, referred to as "IPN" in a cured state, and comprising a multi-functional acrylate, a photo initiator and a thermal initiator.

The present invention also relates to a polarizer comprising: a polarizing film or a polarizing device; and a pressure-sensitive adhesive layer which is formed on one or both sides of said polarizing film or device; and comprises a cured product of the pressure-sensitive adhesive composition according to the present invention.

The present invention also relates to a liquid crystal display comprising a liquid crystal panel in which the polarizer according to the present invention is bonded to one or both sides of a liquid crystal cell.

The present pressure-sensitive adhesive composition is described in more detail below.

The pressure-sensitive adhesive composition includes IPN in a cured state, and the term "cured state" used herein refers to a state in which the pressure-sensitive adhesive composition is prepared in the form of a pressure-sensitive adhesive through UV irradiation, a heating process, and the like. Also, the term "interpenetrating polymer networks (IPN)" used herein refers to a state in which the pressure-sensitive adhesive comprises an additional crosslinking structure (hereinafter, referred to as a "secondary crosslinking structure") formed from reactions of the multi-functional acrylate and the thermal initiator, together with a crosslinking structure (hereinafter, referred to as a "primary crosslinking structure") formed from a base resin.

In the present invention, the components forming the primary crosslinking structure are not specially limited, and any conventional components used in a traditional pressure-sensitive adhesive having a single crosslinking structure may be freely used.

For example, the composition of the present invention may comprise an acrylic copolymer (a base resin) and a multi-functional crosslinking agent, as components forming the primary crosslinking structure.

When the composition comprises an acrylic copolymer as a base resin, the acrylic copolymer may have a weight average molecular weight ($M_w$) of 1,000,000 or more. If the $M_w$ is less than 1,000,000, it is apprehended that the endurance of the adhesive is lowered, so that bubbles or peeling phenomenon may occur due to lowered cohesion under high temperature and/or high humidity conditions. In this case, the upper limit of the $M_w$ is not particularly restricted, and it may be controlled to be not more than 2,500,000. If the $M_w$ is in excess of 2,500,000, it is apprehended that the coating property is lowered due to the increase in viscosity, or endurance decreases.

The specific composition of the copolymer used herein is not particularly restricted. For example, a copolymer may be used herein which comprises 80 to 99.8 parts by weight of a (meth)acrylic acid ester monomer, and 0.01 to 10 parts by weight of a monomer containing a cross-linkable functional group.

In the above, any kind of (meth)acrylic acid ester monomer may be used. For example, alkyl (meth)acrylate may be used. In that case, when the alkyl group has an excessively long chain, it is apprehended that cohesion of the pressure-sensitive adhesive is lowered and the glass transition temperature ($T_g$) and adhesiveness are not easily controlled. Therefore, it is preferred to use a (meth)acrylic acid ester monomer having an alkyl group with 1 to 14 carbon atoms. An example of such a monomer may include one or more selected from the group consisting of methyl(meth)acrylate, ethyl(meth)acrylate, n-propyl(meth)acrylate, isopropyl (meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl (meth)acrylate, isooctyl(meth)acrylate, isononyl(meth) acrylate, lauryl(meth)acrylate and tetradecyl(meth)acrylate. It is preferred that the (meth)acrylic acid ester monomer is comprised in an amount of 80 to 99.8 parts by weight, relative to the content of the monomer containing a cross-linkable functional group. If said content is less than 80 parts by weight, it is apprehended that the initial adhesion strength of the pressure-sensitive adhesive is lowered. If it is in excess of 99.8 parts by weight, it is apprehended that a problem is caused in durability due to lowered cohesion.

The cross-linkable functional group of the monomer can be reacted with a crosslinking agent, and serves to control endurance, adhesion strength and cohesion.

Examples of usable monomers containing a cross-linkable functional group herein may include, but are not limited to, a monomer containing a hydroxy group, a monomer containing a carboxyl group, or a monomer containing nitrogen. In the present invention, one or two or more of the foregoing monomers may be used. Examples of usable monomers containing a hydroxy group herein may include, but are not limited to, one or two or more species of 2-hydroxyethyl(meth)acrylate, 2-hydroxypropyl(meth)acrylate, 4-hydroxybutyl(meth)acrylate, 6-hydroxyhexyl(meth) acrylate, 8-hydroxyoctyl(meth)acrylate, 2-hydroxyethyleneglycol(meth)acrylate or 2-hydroxypropyleneglycol (meth)acrylate. Examples of usable monomers containing a carboxyl group herein may include, but are not limited to, one or two or more species of (meth)acrylic acid, 2-(meth) acryloyloxy acetic acid, 3-(meth)acryloyloxy propylic acid, 4-(meth)acryloyloxy butylic acid, acrylic acid dimer, itaconic acid, maleic acid and maleic anhydride. Examples of usable monomers containing nitrogen herein may include, but are not limited to, one or two or more species of (meth)acrylamide, N-vinyl pyrolidone and N-vinyl caprolactam.

It is preferred that the monomer containing a cross-linkable functional group as above is contained in an amount of 0.01 to 10 parts by weight, relative to the (meth)acrylic acid ester monomer. If said content is less than 0.01 parts by weight, it is apprehended the endurance is decreased. If it is in excess of 10 parts by weight, it is apprehended that adhesiveness and/or peel force is lowered.

In the copolymer, a monomer represented by formula 1 below may be further copolymerized. Such a monomer may be added for controlling the glass transition temperature and giving other functions to the pressure-sensitive adhesive.

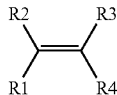

[Formula 1]

wherein $R_1$, $R_2$ and $R_3$ represent independently hydrogen or alkyl, $R_4$ represents cyano; phenyl unsubstituted or substituted with alkyl; acetyloxy; or $COR_5$, where $R_5$ represents amino unsubstituted or substituted with alkyl or alkoxyalkyl; or glycidyloxy.

In the definitions of $R_1$ to $R_5$ in formula 1, alkyl or alkoxy may mean alkyl or alkoxy having 1 to 8 carbon atoms, and may be methyl, ethyl, methoxy, ethoxy, propoxy or butoxy.

The specific monomers represented by formula 1 may include, but are not limited to, one or two or more of nitrogen-containing monomers such as (meth)acrylonitrile, (meth)acrylamide, N-methyl(meth)acrylamide or N-butoxy methyl(meth)acrylamide; a styrene monomer such as styrene or methyl styrene; glycidyl(meth)acrylate; or a carbonic acid vinyl ester such as vinyl acetate, and the like. When the monomer as above is contained in the present acrylic copolymer, the content is, preferably, 20 parts by weight or less, relative to the (meth)acrylic acid ester monomer or the monomer containing a crosslinkable fuctional group. If said content is in excess of 20 parts by weight, it is apprehended that the flexibility and/or peel force of the pressure-sensitive adhesive is lowered.

The method for preparing the copolymer is not particularly restricted. For example, it can be prepared through general methods such as solution polymerization, photopolymerization, bulk polymerization, suspension polymerization, or emulsion polymerization. In one embodiment, the copolymer may be prepared by solution polymerization. Preferably, such solution polymerization is carried out at a polymerization temperature of 50° C. to 140° C. by mixing an initiator wherein each monomer is homogeneously mixed. Any commonly used initiator, for example, an azo-based polymerization initiator such as azo-bisisobutyronitrile or azobiscyclohexanecarbonitrile; and/or a peroxide such as benzoyl peroxide or acetyl peroxide may be included as the initiator.

The present pressure-sensitive adhesive composition may further comprise a multi-functional crosslinking agent, which can react with the copolymer and give a crosslinking structure to the adhesive.

The specific cross-linking agent which may be used herein is not particularly restricted, and may include, for example, an isocyanate compound, an epoxy compound, an aziridine compound and a metal chelate compound.

Examples of the isocyanate compound include tolylene diisocyanate, xylene diisocyanate, diphenylmethane diisocyanate, hexamethylene diisocyanate, isophorone diisocyanate, tetramethylxylene diisocyanate, naphthalene diisocyanate and a reaction product of any one of the foregoing with a polyol such as trimethylol propane; examples of the epoxy compound include ethyleneglycol diglycidylether, triglycidylether, trimethylolpropane triglycidylether, N,N,N'N'-tetraglycidyl ethylenediamine and glycerin diglycidylether; examples of the aziridine compound include N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinyl-phosphine oxide. Also, examples of the metal chelate compound include compounds in which a multivalent metal such as aluminum, iron, zinc, tin, titan, antimony, magnesium and/or vanadium is chelated to acetyl acetone or ethyl acetoacetate. In the present invention, one or two or more of the forgoing may be used alone or in a mixture thereof.

The cross-linking agent may be contained in an amount of 0.01 to 10 parts by weight, preferably 0.01 to 5 parts by weight, relative to 100 parts by weight of the base resin (acrylic copolymer). If said content is less than 0.01 parts by weight, it is apprehended that the cohesion of the pressure-sensitive adhesive is lowered. If it is in excess of 10 parts by weight, it is apprehended that the endurance is lowered, so that interlayer peeling or loosing phenomenon may occur.

The pressure-sensitive adhesive composition comprises a multi-functional acrylate together with the base resin as previously described. The multi-functional acrylate may form the secondary crosslinking structure. The specific acrylate usable herein is not particularly limited, and a multi-functional acrylate which has a molecular weight of less than 1,000 and contains three or more functional groups, may be used. Examples of such an acrylate may include, but are not limited to, a trifunctional acrylate such as trimethylolpropane tri(meth)acrylate, dipentaerythritol tri(meth) acrylate, propionic acid-modified dipentaerythritol tri(meth) acrylate, pentaerythritol tri(meth)acrylate, propyleneoxide-modified trimethylolpropane tri(meth)acrylate, trifunctional urethane(meth)acrylate or tris(meth)acryloxy ethylisocyanurate; a tetrafunctional acrylate such as diglycerin tetra (meth)acrylate or pentaerythritol tetra(meth)acrylate; a pentafunctional acrylate such as propionic acid-modified dipentaerythritol penta(meth)acrylate; and a hexafunctional acrylate such as dipentaerythritol hexa(meth)acrylate, caprolactone-modified dipentaerythritol hexa(meth)acrylate or urethane (meth)acrylate (ex. a reaction product of trimethylolpropane tri(meth)acrylate and an isocyanate monomer).

Herein, one or a mixture of two or more of the multi-functional acrylates as above may be used. Especially, it is preferred to use an acrylate having a cyclic structure in its skeleton. By using such an acrylate, the light leakage-preventing properties can be further improved since it is possible to design the pressure-sensitive adhesive to be harder. At this time, the cyclic structure may comprise a carbocyclic or heterocyclic structure; or a monocyclic or polycyclic structure. An example of an acrylate comprising the cyclic structure may include a monomer having an isocyanurate structure such as tris(meth)acryloxy ethyl isocyanurate; and a hexafunctional acrylate such as an isocyanate-modified urethane(meth)acrylate (ex. a reaction product of trimethylolpropane tri(meth)acrylate and an isocyanate monomer).

In the pressure-sensitive adhesive composition, the multi-functional acrylate as above is, preferably, contained in an amount of 5 to 40 parts by weight, relative to 100 parts by weight of the base resin. If the content is less than 5 parts by weight, it is apprehended that light leakage-preventing properties and/or durability under high temperature decrease. If the content is in excess of 40 parts by weight, it is apprehended that durability under high temperature decreases.

The pressure-sensitive adhesive composition comprises a photo-initiator together with the multi-functional acrylate. The photo initiator may improve the physical properties of the adhesive by reacting with the multi-functional acrylate during preparation processes for the adhesive by UV irradiation, and the like. The specific photo initiator is not particularly limited, and examples thereof may include benzoin, benzoin methylether, benzoin ethylether, benzoin isopropylether, benzoin n-butylether, benzoin isobutylether, acetophenone, dimethylanino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenylketone, 2-methyl-1-[4-(methylthio) phenyl]-2-morpholino-propan-1-one, 4-(2-hydroxyethoxy) phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphineoxide. In the present invention, one or two or more of the foregoing monomers may be used.

The photo initiator may be comprised in an amount of 0.01 to 10 parts by weight, preferably 0.01 to 5 parts by weight, relative to 100 parts by weight of the base resin (acrylic copolymer). Also, the photo initiator may be comprised in an amount of 0.2 to 20 parts by weight, relative to 100 parts by weight of the multi-functional acrylate. If the content of the photo initiator is outside of said range, it is apprehended that the reaction with the multi functional acrylate would not be complete, or the physical properties of the adhesive are degraded due to the remaining components after reaction.

The pressure-sensitive adhesive composition comprises a thermal initiator. Although it is not particularly limited, it is preferable that a thermal initiator having a 10 hour half-life decomposition temperature of not less than 40° C., and less than 100° C. is used. If the temperature is less than 40° C., it is apprehended that it is difficult to use due to excessive lowering of the pot-life of a coating liquid. If the temperature is not less than 100° C., a shrinking problem of a base film to be coated by the liquid may occur during a drying process, since a high temperature is needed to decompose the initiator during the coating process.

The specific thermal initiator which may be used herein is not particularly restricted, and may include, for example, an azo compound or a peroxide compound. The azo compound may include 2,2-azobis(2-methylbutyronitrile), 2,2'-azobis-2,4-dimethylvaleronitrile (V-65, manufactured by Wako), 2,2-azobisisobutyronitrile (V-60, manufactured by Wako) or 2,2-azobis-2-methylbutyronitrile (V-59, manufactured by Wako). The peroxide compound may include tetramethylbutylperoxy neodecanoate (ex. Perocta ND, manufactured by NOF); bis(4-butylcyclohexyl)peroxy dicarbonate (ex. Peroyl TCP, manufactured by NOF); di(2-ethylhexyl)peroxy carbonate; butylperoxy neodecarnoate (ex. Perbutyl ND, manufactured by NOF); dipropyl peroxydicarbonate (Peroyl NPP, manufactured by NOF); diisopropyl peroxy dicarbonate (Peroyl IPP, manufactured by NOF); diethoxyethyl peroxy dicarbonate (ex. Peroyl EEP, manufactured by NOF); diethoxyhexyl peroxy dicarbonate (ex. Peroyl OEP, manufactured by NOF); hexyl peroxy dicarbonate (ex. Perhexyl ND, manufactured by NOF); dimethoxybutyl peroxy dicarbonate (ex. Peroyl MBP, manufactured by NOF); bis-4-butylcyclohexyl peroxydicarbonate (Peroyl TCP, manufactured by NOF); diethoxy ethyl peroxy dicarbonate (Peroyl EEP, manufactured by NOF); t-butylperoxy neoheptanoate; diethoxyhexyl peroxy dicarbonate (Peroyl OPP, manufactured by NOF); hexyl peroxy dicarbonate (Perhexyl ND, manufactured by NOF); dimethoxybutyl peroxy dicarbonate (Peroyl MBP, manufactured by NOF); bis(3-methoxy-3-methoxybutyl)peroxy dicarbonate (Peroyl SOP, manufactured by NOF); dibutyl peroxy dicarbonate; dicetyl peroxy dicarbonate; dimyristyl peroxy dicarbonate; 1,1,3,3-tetramethylbutyl peroxypivalate; hexylperoxy pivalate (Perhexyl PV, manufactured by NOF); amyl peroxy pivalate (Luperox 546M75, manufactured by Atofina); t-butylperoxy pivalate; t-amylperoxy-2-ethylhexanoate; butyl peroxy pivalate (Perbutyl, manufactured by NOF); trimethylhexanoyl peroxide (Peroyl 355, manufactured by NOF); dimethyl hydroxybutyl peroxyneodecanoate (Luperox 610M75, manufactured by Atofina); amyl peroxy neodecanoate (Luperox 546M76, manufactured by Atofina); butyl peroxy neodecanoate (Luperox 10M75, manufactured by Atofina); 3,5,5-trimethylhexanoyl peroxide; lauryl peroxide; dilauroyl peroxide; didecanoyl peroxide; benzoyl peroxide or dibenzoyl peroxide. In the present invention, one or two or more of the forgoing may be used alone or in a mixture thereof.

The thermal initiator as above may be contained in an amount of 0.01 to 5 parts by weight, relative to 100 parts by weight of the base resin. If the content is less than 0.01 parts by weight, it is apprehended that light leakage-preventing properties are decreased. If the content is in excess of 5 parts by weight, it is apprehended that durability decreases.

The present pressure-sensitive adhesive composition may further comprise a silane coupling agent in addition to the components as described above. Such a coupling agent improves adhesion and bonding stability between the pressure-sensitive adhesive and a glass substrate, whereby heat resistance and humidity resistance can be further improved. Also, when the pressure-sensitive adhesive is left under high temperature and/or high humidity for a long time, the coupling agent serves to improve attachment reliability. Examples of usable coupling agents may include, but are not limited to, γ-glycidoxypropyltrimethoxy silane, γ-glycidoxypropylmethyldiethoxy silane, γ-glycidoxypropyltriethoxy silane, 3-mercaptopropyl trimethoxy silane, vinyltrimethoxy silane, vinyl triethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetate propyl trimethoxy silane, γ-acetoacetate propyl triethoxy silane, β-cyanoacetyl trimethoxy silane, β-cyanoacetyl triethoxy silane, and acetoacetoxy trimethoxy silane. One or two or more of the forgoing may be used alone or in a mixture thereof. In one embodiment, a silane coupling agent containing an acetoacetate group or a β-cyanoacetyl group may be used. Preferably, such a silane coupling agent is contained in an amount of 0.01 to 5 parts by weight, and preferably 0.01 to 1 parts by weight in the composition, relative to 100 parts by weight of the base resin. If said content is less than 0.01 parts by weight, it is apprehended that the increased adhesion strength effect is very slight. If it is in excess of 5 parts by weight, it is apprehended that the endurance decreases.

In one embodiment, from the viewpoint of controlling adhesion performance, the pressure-sensitive adhesive composition may further comprise 1 to 100 parts by weight of a tackifier resin, relative to 100 parts by weight of the base resin. The specific tackifier resin is not particularly restricted, and may use one or two or more mixtures of a (hydrogenated) hydrocarbon resin, a (hydrogenated) rosin resin, a (hydrogenated) rosin ester resin, a (hydrogenated) terpene resin, a (hydrogenated) terpene phenol resin, a polymerized rosin resin, or a polymerized rosin ester resin, and the like. If the content of said tackifier resin is less than 1 part by weight, it is apprehended that the effects of adding it are very slight. If it is in excess of 100 parts by weight, it is apprehended that the improved compatibility and/or cohesion effects are lowered.

In one embodiment, the present pressure-sensitive adhesive composition may further comprise one or more additives selected from the group consisting of an epoxy resin, a hardener, a UV stabilizer, an antioxidant, a colorant, a reinforcing agent, a filling agent, a defoaming agent, a surfactant and a plasticizer in a range of not affecting the effect of the present invention.

In addition, the present invention relates to a polarizer, comprising: a polarizing film or a polarizing device; and a pressure-sensitive adhesive layer which is formed on one or both sides of said polarizing film or device, and comprises a cured product of the pressure-sensitive adhesive composition, according to the present invention, as described above.

The specific kind of polarizing film or polarizing device constituting said polarizer of the present invention is not particularly restricted. For example, a film obtained by adding a polarizing component such as iodine or dichroic dye into a polyvinyl alcohol resin film, and elongating the resulting product may be used as said polarizing film. Said polyvinyl alcohol resin may comprise polyvinyl alcohol, polyvinyl formal, polyvinyl acetal and hydrolysate of ethylene-vinyl acetate copolymer, and the like. The thickness of said polarizing film is also not particularly restricted. It may be formed having a usual thickness.

The polarizer may be formed as a multilayer film, wherein protective films, such as a cellulose film, for example, triacetyl cellulose; a polyester film, for example a polycarbonate film or a polyethylene terephthalate; a polyether sulphone film; and/or a polyolefin film, for example, polyethylene film, polypropylene film, polyolefin film having a cyclo or norbornene structure, or ethylene-propylene copolymer, are laminated on one or both sides of the polarizing film. The thickness of these protective films is also not particularly restricted, and they may be formed having a usual thickness.

The method of forming the pressure-sensitive adhesive layer on the polarizing film or device as above is not particularly restricted, and may be used, for example, as a method of coating and hardening the pressure-sensitive adhesive composition on said polarizing film with a bar coater and the like, or a method of coating and drying the pressure-sensitive adhesive on the surface of releasable substrate and then, transferring the pressure-sensitive adhesive layer to the surface of a polarizing film.

It is preferred from the viewpoint of carrying out homogeneous coating that the crosslinking agent is controlled so that a cross-linking reaction of functional groups is not performed on forming the pressure-sensitive adhesive layer. That is, said crosslinking agent forms a cross-linking structure in drying and aging steps after coating to improve cohesion, whereby it may improve the physical properties of pressure-sensitive adhesive articles such as adhesive property and cuttability.

In addition, on forming said pressure-sensitive adhesive layer, it is preferred to use the composition after sufficiently removing components causing bubbles such as volatile ingredients or reaction residues within the composition. If the cross-linking density or molecular weight is excessively low and thus elasticity modulus is lowered, it is apprehended that scatterers are formed inside by magnifying small bubbles present between the glass plate and the pressure-sensitive adhesive layer at high temperature conditions.

On preparing pressure-sensitive adhesive polarizers, the method of hardening the pressure-sensitive adhesive composition of the present invention is not particularly limited. For example, it may be carried out by applying enough heat to activate the thermal initiator contained in the composition.

On preparing pressure-sensitive adhesive polarizers, the method of hardening the pressure-sensitive adhesive composition is not particularly limited, and the hardening process may be accomplished by heating and/or irradiating the coating liquid with activating energy rays such as UV or electron rays such that the contained photo initiator and/or thermal initiator may be activated. In one embodiment, the hardening process may be accomplished by heating and irradiating the coating liquid with activating energy rays simultaneously.

When UV irradiation is applied, such UV irradiation may be obtained by using, for example, means such as a high pressure mercury lamp, an induction lamp or a xenon lamp. The irradiation dose is not particularly restricted, as long as it is controlled in an extent of accomplishing sufficient hardening without damaging every physical property. For example, it is preferred that it has an illuminance of 50 $mW/cm^2$ to 1,000 $mW/cm^2$ and a light intensity of 50 $mJ/cm^2$ to 1,000 $mJ/cm^2$.

In the present pressure-sensitive adhesive layer, the gel content as represented in General Formula 1 below is preferably 80% to 99% and more preferably 90% to 99%.

Gel Content (%)=$B/A$×100      [General Formula 1]

wherein A represents the weight of the pressure-sensitive adhesive, and B represents the dry weight of insoluble content after depositing the adhesive in ethyl acetate at ambient temperature for 48 hours.

If said gel content is less than 80%, it is apprehended that the endurance under high temperature and/or high humidity conditions is decreased. If it is in excess of 99%, it is apprehended that the stress relief properties of the pressure-sensitive adhesive are lowered.

In one embodiment, the present polarizer may further comprise one or more functional layers selected from the group consisting of a protective layer, a reflecting layer, an anti-glare layer, a phase difference plate, a compensation film for wide viewing angle, and a brightness enhancing film. The specific kind of material, preparation method, and thickness of the functional layers is not particularly limited, and conventional ones can be applied.

In addition, the present invention relates to a liquid crystal display comprising a liquid crystal panel, in which the polarizer according to the present invention is bonded to one or both sides of a liquid crystal cell.

The specific kind of liquid crystal cell, constituting the liquid crystal display of the present invention as above, is not particularly restricted, and includes all general liquid crystal cells such as TN (Twisted Neumatic), STN (Super Twisted Neumatic), IPS (In Plane Switching) or VA (Vertical Alignment). The specific kind of other construction included in the liquid crystal display of the present invention and process for preparing the same is not particularly restricted, and general constructions in this field may be selected and used without limitation.

MODE FOR THE INVENTION

Examples

The present invention is explained in more detail through examples according to the present invention and comparative examples not according to the present invention below, but the scope of the present invention is not restricted to the examples as described below.

Example 1

Preparation of Acrylic Copolymer

To a 1 L reactor, in which nitrogen gas was refluxed and is equipped with a cooling system for easy temperature control, was added a mixture of monomers consisting of 99 parts by weight of n-butyl acrylate (n-BA) and 1.0 parts by weight of hydroxyl ethylacrylate (HEA). Then, 120 parts by weight of ethyl acetate (EAc) was added thereto as a solvent. To remove oxygen, the reactor was purged with nitrogen gas for 60 minutes. Then, the temperature was kept at 60° C. and 0.03 parts by weight of azobisisobutyronitrile (AIBN) as an initiator was added thereto and reacted for 8 hours. After the reaction, the resulting product was diluted with ethyl acetate (EAc) to prepare an acrylic copolymer having a solid content of 15% by weight, a weight average molecular weight of 1,600,000, and a molecular weight distribution of 4.9.

Preparation of Pressure-Sensitive Adhesive Composition

Relative to 100 parts by weight of the acrylic copolymer as prepared above, 15 parts by weight of hexafunctional acrylate (isocyanate-modified urethane acrylate; a reaction product of isocyanate and pentaerythritol triacrylate), 5 parts by weight of trifunctional urethane acrylate (tris(meth)acryloxy ethyl isocyanurate), 1.0 parts by weight of XDI isocyanate hardener (D110N, manufactured by Mitsui Takeda, (JP)), 2.5 parts by weight of lauryl peroxide as a thermal initiator, 0.5 parts by weight of hydroxyl cyclohexylphenyl ketone (manufactured by Ciba Specialty Chemicals (Swiss)) as a photo-initiator and 0.1 parts by weight of silane coupling agent containing a β-cyanoacetyl group (M812, manufactured by LG Chemical Ltd.) were mixed and the concentration of solid content in the resulting coating liquid was controlled to 15%, to prepare a pressure-sensitive adhesive composition.

Preparation of Pressure-Sensitive Adhesive Polarizer

The pressure-sensitive adhesive composition as prepared above was coated on a polyethyleneterephthalate (PET) (MRF-38, manufactured by Mitsubishi Corporation) film that had been subjected to release treatment, and had a thickness of 38 microns so as to have a thickness of 25 microns after drying, and said film was dried in an oven at 110° C. for 3 minutes. Then, the dried pressure-sensitive adhesive layer was stored in a Temperature and Humidity Room Chamber (23° C., 55% RH) for about one day, and laminated on the WV coating layer of the polarizer on one side of which a WV (Wide View) liquid crystal layer was coated. Then, the pressure-sensitive adhesive layer was treated with UV under the following conditions to prepare a pressure-sensitive adhesive polarizer.

UV irradiator: High pressure mercury lamp
Irradiation Conditions: Illuminance=600 mW/cm$^2$
Light Intensity=150 mJ/cm$^2$ Examples 2 to 5 and Comparative Examples 1 to 3

Pressure-sensitive adhesive polarizers were prepared by the same method as Example 1, except that components as shown in Table 1 below were mixed with the acrylic copolymers as prepared above.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Acrylic copolymer | 100 | 100 | 100 | 100 | 100 | 100 | 100 | 100 |
| Multi-function A | 15 | 15 | 15 | 20 | 15 | 20 | 25 | — |
| Multi-function B | 5 | 5 | 5 | — | 10 | — | — | — |
| Crosslinking agent | 1.0 | 1.0 | 1.0 | 1.0 | 1.0 | 1.0 | 1.0 | 1.0 |
| LPO | 2.0 | 2.0 | 2.0 | 2.0 | 2.0 | — | — | — |
| Irg184 | 1.0 | 1.4 | 1.6 | 1.0 | 1.0 | 1.0 | 1.0 | — |
| M812 | 0.1 | 0.1 | 0.1 | 0.1 | 0.1 | — | — | — |
| KBM-403 | — | — | — | — | — | 0.1 | 0.1 | 0.1 |
| Drying temp. (° C.) | 110 | 120 | 130 | 110 | 110 | 110 | 110 | 110 |
| Drying time (min) | 3 | 3 | 3 | 3 | 3 | 3 | 3 | 3 |

Multi-function A: hexafunctional urethaneacrylate (isocyanate-modified urethane acylate)
Multi-function B: trifunctional urethane acrylate(tris(meth)acryloxy ethyl isocyanurate)
Crosslinking agent(Hardner): XDI isocyanate(D110N)
LPO: lauryl peroxide (manufactured by Sekiakema (Korea)
Irg184: photoinitiator(hydroxyl cyclohexylphenyl ketone)(Ciba Specialty Chemicals (Swiss))
M812: silane coupling agent containing β-cyanoacetyl group (LG Chemical (Korea))
KBM-403: silane coupling agent containing glycydyl group (Sinetsu (Japan))

Using the polarizers prepared in the Examples and Comparative Examples, gel fraction, adhesion strength, removability, endurance, uniformity of light transmission (light leakage) and modulus were measured by the methods as described below.

1. Measurement of Gel Fraction

The prepared pressure-sensitive adhesive layer was left in a constant temperature and humidity chamber (23° C., 60% RH) for about 7 days. Then, about 0.3 g of the pressure sensitive adhesive was poured into a stainless 200 mesh wire net and dipped into 100 ml of ethyl acetate. The resulting product was stored in a dark room at room temperature for 3 days. Then, the insoluble content was separated and dried in an oven at 70° C. for 4 hours. Then, its weight was measured and the gel fraction was determined.

2. Evaluation of Adhesion Strength and Removability

The prepared polarizer was cut to a size of 25 mm×100 mm (width×length) to prepare a sample, and then adhered to an alkali-free glass using a laminator after removing the releasing sheet. Then, the resulting product was pressed in an autoclave (50° C., 0.5 atmospheres) for about 20 minutes, and stored in the Temperature and Humidity Room Chamber (23° C., 50% RH) for 4 hours. Then, adhesion strength was measured under the conditions of a detachment speed of 300 mm/min and a detachment angle of 180 degrees using a Texture analyzer (Stable Micro Systems Ltd. (UK)), and removability was evaluated through this measurement, based on the following basis.

◯: after 1 day, adhesion strength being 800 or less
Δ: after 1 day, adhesion strength being 1,000 or more
x: after 1 day, adhesion strength being 2,000 or more 3. Evaluation of Endurance The prepared polarizer was cut to a size of 180 mm×250 mm (width×length) to prepare a sample, and said sample was attached to a 19 inch panel commonly available on the market using a laminator. Then, the resulting product was pressed in an autoclave (50° C., 5 atmospheres) for about 20 minutes, and stored in the Temperature and Humidity Room Chamber (23° C., 50% RH) for 24 hours. Then, to evaluate moisture-heat resistance of the prepared specimens, they were left at a temperature of 60° C. and a relative humidity of 90% RH for 500 hours and then evaluated for the formation of bubbles or peeling. Also, in order to know their heat-resistance, they were left at 90° C. and 105° C. for 500 hours and then evaluated for the formation of bubbles or peeling. The evaluation was carried out after specimens were left at room temperature for 24 hours immediately before evaluating their states. The evaluation standard of humidity resistance and heat resistance was as follows.

○: No bubble and peeling phenomenon were observed.

Δ: A few bubbles and/or peeling phenomenon were observed.

x: Many bubbles and/or peeling phenomenon were observed.

4. Light Transmission Uniformity

The evaluation of light transmission uniformity was carried out using the same specimens as that used for evaluating the endurance. As a method of testing light transmission uniformity, a polarizer with attached pressure-sensitive adhesive layer was attached to a 22 inch monitor (manufactured by LG Philips LCD), stored under constant temperature and humidity conditions for 1 day, left in an oven at 80° C. for 240 hours, and evaluated for light transmission uniformity of four side conferences in the monitor square. The evaluation of light transmission uniformity was carried out by calculating an increasing ratio of luminance relative to the center part of the monitor after determining the luminance value in the upper and lower sides of the monitor, and the right and left sides of the monitor, at regular intervals relative to the center part of the monitor by using a spectroradiometer CS-2000 (KONICA MINOLTA(JP)). If an increasing ratio of luminance is calculated, more light leakage is generated.

5. Haze

The pressure-sensitive adhesive layer (thickness: 23 micron) was prepared by irradiating a pressure-sensitive adhesive composition between releasing films (MRF-38, thickness: 38 microns, manufactured by Mitsubishi (JP)) with UV. The haze of the prepared pressure-sensitive adhesive layer was evaluated by using a hazemeter (HR-100, manufactured by Murakami (JP)) according to JIS K 7105-1 standard.

6. Modulus of Pressure-Sensitive Adhesive

The pressure-sensitive adhesive was prepared by irradiating a pressure-sensitive adhesive composition between releasing films (MRF-38, thickness: 38 microns, manufactured by Mitsubishi (JP)) with UV. Then a pressure-sensitive adhesive layer having a thickness of about 25 μm was prepared by aging the prepared pressure-sensitive adhesive under constant temperature and humidity conditions (23° C., 50% RH) for 7 days. Then the releasing film, on which a pressure-sensitive adhesive layer was formed, was cut to a size of 6 cm×6 cm, and then the pressure-sensitive adhesive was uniformly rolled to prepare a pressure-sensitive adhesive bar (length: about 6 cm, thickness: about 2 mm). The pressure-sensitive adhesive bar was then securely adhered to upper and lower chucks by rubber gasket in a Texture analyzer (Stable Micro Systems Ltd. (UK)), and then the gauge length was adjusted to be 2 cm. While applying a force at a stretching speed of 120 mm/min, the stress according to an increase in length was determined. Young's modulus of the pressure-sensitive adhesive was calculated by determining stress at the point that the length of the pressure-sensitive adhesive bar increased by 100%.

The results measured by the methods as above were arranged and described in Table 2.

TABLE 2

| | Example | | | | | Comparative Example | | |
|---|---|---|---|---|---|---|---|---|
| | 1 | 2 | 3 | 4 | 5 | 1 | 2 | 3 |
| Gel Content (%) | 95 | 97 | 98 | 98 | 92 | 92 | 96 | 98 |
| Adhesion Strength (gf/25 mm) | 400 | 300 | 250 | 200 | 300 | 200 | 50 | 600 |
| Re-movability | ○ | ○ | ○ | ○ | ○ | ○ | ○ | Δ |
| Heat Resistance Durability (90° C.) | ○ | ○ | ○ | ○ | ○ | Δ | Δ | X |
| Heat Resistance Durability (105° C.) | ○ | ○ | ○ | ○ | ○ | Δ | X | X |
| Heat Humidity Resistance Durability | ○ | ○ | ○ | ○ | ○ | Δ | Δ | X |
| Light Transmission Uniformity(%) (up and down) | 28 | 35 | 22 | 46 | 50 | 270 | 90 | 350 |
| Light Transmission Uniformity(%) (right and left) | 45 | 47 | 24 | 35 | 38 | 340 | 150 | 650 |
| Haze (%) | 6.5 | 6.8 | 6.1 | 7.0 | 7.5 | 6.9 | 8.0 | 6.3 |
| Modulus(MPa) | 1.6 | 1.7 | 1.7 | 1.9 | 2.1 | 0.8 | 1.0 | 0.1 |

As can be seen from the results of Table 2 above, in the case of Examples 1 to 5, they showed excellent light leakage-preventing properties even when applied to a large monitor having a size of 22 inches, with having superior physical properties such as endurance, pressure-sensitive adhesive properties and removability.

However, in the case of Comparative Example 1, in which a thermal initiator is not included, a lot of light leakage phenomena were generated at the upper and lower sides, and right and left sides of the monitor. Also, the pressure-sensitive adhesive in Comparative Example 1 shows very poor heat humidity resistance durability and heat resistance durability. Also, in the case of Comparative Example 2, endurance was very poor, and in the case of Comparative Example 3, light leakage preventing properties and endurance were all very poor.

INDUSTRIAL APPLICABILITY

According to the present invention, a pressure-sensitive adhesive composition is provided, which has excellent physical properties such as endurance under high temperature and/or high humidity conditions, cuttability, removability and workability, and representing excellent light leakage-preventing properties even in the case of being used in large display devices with a size of 20 inches or more, a polarizer and a liquid crystal display using the same.

The invention claimed is:

1. A polarizer, comprising:
   a polarizing film or a polarizing device; and
   a pressure-sensitive adhesive layer disposed on one or both sides of the polarizing film or the polarizing device, the pressure-sensitive adhesive layer comprising a cured product of the pressure-sensitive adhesive composition,
   wherein the pressure-sensitive adhesive composition includes an interpenetrating polymer network in a cured state, wherein the composition comprises an acrylic copolymer, a multi-functional crosslinking agent, a multi-functional acrylate, a photo free-radical initiator and a thermal free-radical initiator, of which has a 10 hours half-life temperature of not less than 40° C. and less than 100° C., wherein the composition comprises 5 to 40 parts by weight of the multi-functional acrylate, 0.01 to 10 parts by weight of the photo free-radical initiator and 0.01 to 5 parts by weight of the thermal free-radical initiator, relative to 100 parts by weight of the acrylic copolymer, and wherein both of the photo free-radical initiator and the thermal free-radical initiator react with the multi-functional acrylate, wherein the interpenetrating polymer network is a state in which the pressure-sensitive adhesive composition comprises a crosslinking structure formed from reactions of the multifunctional acrylate, the photo free-radical initiator and the thermal free-radical initiator, together with an additional crosslinking structure formed from reactions of the acrylic copolymer and the multi-functional crosslinking agent, wherein the pressure-sensitive adhesive composition has a form of pressure-sensitive adhesive having re-movability in the cured state, and the pressure-sensitive adhesive has an adhesion strength with respect to alkali-free glass of 800 gf/25 mm or less, and wherein a light transmission uniformity of the polarizer is 22 to 50%.

2. The polarizer according to claim 1,
wherein the acrylic copolymer has a weight average molecular weight of 1,000,000 or more.

3. The polarizer according to claim 1,
wherein the acrylic copolymer comprises 80 to 99.8 parts by weight of a (meth)acrylic acid ester monomer; and 0.01 to 10 parts by weight of a monomer containing a crosslinkable functional group.

4. The polarizer according to claim 3,
wherein the (meth)acrylic acid ester monomer is one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate.

5. The polarizer according to claim 3,
wherein the monomer containing a cross-linkable functional group is one or more selected from the group consisting of a monomer containing a hydroxyl group, a monomer containing a carboxyl group and a monomer containing nitrogen.

6. The polarizer according to claim 3,
wherein the acrylic copolymer further comprises a monomer represented by formula 1:

wherein $R_1$, $R_2$ and $R_3$ represent independently hydrogen or alkyl, $R_4$ represents cyano; phenyl unsubstituted or substituted with alkyl; acetyloxy; or $COR_5$, where $R_5$ represents amino unsubstituted or substituted with alkyl or alkoxyalkyl; or glycidyloxy.

7. The polarizer according to claim 1,
wherein the multi-functional crosslinking agent is one or more selected from the group consisting of an isocyanate compound, an epoxy compound, an aziridine compound and a metal chelate compound.

8. The polarizer according to claim 1,
wherein, the multi-functional crosslinking agent is comprised in an amount of 0.01 to 10 parts by weight, relative to 100 parts by weight of the acrylic copolymer.

9. The polarizer according to claim 1,
wherein the multi-functional acrylate is one or more selected from the group consisting of tri-functional acrylate, tetra-functional acrylate, penta-functional acrylate and hexa-functional acrylate.

10. The polarizer according to claim 1,
wherein the photo free-radical initiator is one or more selected from the group consisting of benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-prop yl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo [2-hydroxy-2-methyl-1-[4-(1-methylvinyl)phenyl]propanone] and 2,4,6-trimethylbenzoyl-diphenyl-phosphineoxide.

11. The polarizer according to claim 1,
wherein the thermal free-radical initiator is an azo compound or a peroxide compound.

12. The polarizer according to claim 1,
wherein a gel content as represented by General Formula 1 is 80% to 99%:

Gel Content (%)=$B/A$×100   [General Formula 1]

wherein A represents the weight of the pressure-sensitive adhesive, and B represents the dry weight of insoluble content after depositing the adhesive in ethyl acetate at room temperature for 48 hours.

13. A liquid crystal display comprising a liquid crystal panel in which the polarizer according to claim 1 is bonded to one or both sides of a liquid crystal cell.

* * * * *